(12) United States Patent
Silverstein et al.

(10) Patent No.: US 12,417,591 B2
(45) Date of Patent: Sep. 16, 2025

(54) SMART GLASSES WITH ENHANCED OPTICAL STRUCTURES FOR AUGMENTED REALITY APPLICATIONS

(71) Applicant: Meta Platforms Technologies, LLC, Menlo Park, CA (US)

(72) Inventors: Barry David Silverstein, Kirkland, WA (US); Kieran Connor Kelly, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 190 days.

(21) Appl. No.: 18/064,772

(22) Filed: Dec. 12, 2022

(65) Prior Publication Data

US 2023/0316672 A1  Oct. 5, 2023

Related U.S. Application Data

(60) Provisional application No. 63/326,566, filed on Apr. 1, 2022.

(51) Int. Cl.
G09G 5/00 (2006.01)
G02B 27/01 (2006.01)
G06T 19/00 (2011.01)

(52) U.S. Cl.
CPC ........ *G06T 19/006* (2013.01); *G02B 27/0172* (2013.01); *G02B 2027/0178* (2013.01)

(58) Field of Classification Search
CPC ......... G06T 19/006; G06T 19/00; G06T 7/74; G06T 7/94; G06T 11/00;
(Continued)

(56) References Cited

U.S. PATENT DOCUMENTS 5,703,703 A  12/1997 Yamate
9,927,615 B2  3/2018 Ma et al.
(Continued)

FOREIGN PATENT DOCUMENTS

CN  212160230 U  12/2020
DE  4234567 A1  4/1994
(Continued)

OTHER PUBLICATIONS

EPO—International Search Report and Written Opinion for related International Application No. PCT/US2023/017227, mailed Jul. 20, 2023, 10 pages.

*Primary Examiner* — Gordon G Liu
(74) *Attorney, Agent, or Firm* — Greenberg Traurig, LLP

(57) ABSTRACT

A wearable device for augmented reality applications including an image generation engine to generate multiple light rays forming an image, and an eyepiece including a display to project the image to a user for an augmented reality application, is provided. The eyepiece includes a planar waveguide configured to transmit the light rays from the image generation engine. The wearable device also includes at least one optical element configured to couple the light rays into, and to provide the light rays from, the planar waveguide and through an eyebox limiting a volume that includes a pupil of the user, and a user-functional portion of the eyepiece including the at least one optical element, the user-functional portion shaped according to a pre-selected format that is aesthetically appealing to an onlooker when the immersive reality device is worn by a user.

20 Claims, 7 Drawing Sheets

(58) Field of Classification Search
CPC . G06T 2207/10012; G06T 2207/20021; G06F 3/011; G06F 3/012; G06F 3/04815; G02B 27/017; G02B 1/041; G02B 2027/0178; H04L 67/52; H04N 7/152; G06V 20/20
USPC ......................................................... 345/633
See application file for complete search history.

(56) References Cited

U.S. PATENT DOCUMENTS

| | | |
|---|---|---|
| 10,545,714 B2 | 1/2020 | Rochford et al. |
| 10,613,330 B2 | 4/2020 | Imoto et al. |
| 10,613,376 B2 | 4/2020 | Aieta |
| 2016/0054565 A1 | 2/2016 | Izumihara et al. |
| 2018/0149869 A1* | 5/2018 | Bergquist ............... G02C 7/165 |
| 2018/0210146 A1* | 7/2018 | Klug ................... G02B 6/02085 |
| 2018/0313981 A1 | 11/2018 | Cobb et al. |
| 2019/0086674 A1 | 3/2019 | Sinay et al. |
| 2019/0139290 A9 | 5/2019 | Solomon |
| 2020/0012124 A1* | 1/2020 | Waite ....................... G02B 3/12 |
| 2020/0088999 A1 | 3/2020 | Wang |
| 2023/0314804 A1* | 10/2023 | Chatterjee .......... G02B 27/0172 359/630 |

FOREIGN PATENT DOCUMENTS

| | | |
|---|---|---|
| JP | H062369 U | 1/1994 |
| WO | 2016051325 A1 | 4/2016 |

\* cited by examiner

SMART GLASSES WITH ENHANCED OPTICAL STRUCTURES FOR AUGMENTED REALITY APPLICATIONS

CROSS-REFERENCE TO RELATED APPLICATIONS

The present application is related and claims priority under 35 U.S.C. § 119(e) to U.S. Prov. Appln. Ser. No. 63/326,566, to Barry SILVERSTEIN et al., entitled SMART GLASSES WITH ENHANCED OPTICAL STRUCTURES FOR AUGMENTED REALITY APPLICATIONS, filed on Apr. 1, 2022, the contents of which are hereinafter incorporated by reference in their entirety, for all purposes.

BACKGROUND

Field

The present application is directed to smart glasses having enhanced optical structures that, in addition to having a selected optical functionality, provide an aesthetically appealing view to an onlooker. More specifically, embodiments as disclosed herein include smart glasses having visually appealing optical structures to provide augmented reality (AR) applications.

Related Art

In the field of lens manufacturing, there are multiple examples of coatings and other decorative features added to the eyepieces of a smart glass, for the enjoyment of onlookers. These decorations are typically not integrated into the optical operation of the smart glass, and most of the time simply interfere with the user's field-of-view (FOV) or block it. On the other hand, smart glasses and other headset wearables tend to have optical structures that are visible to the onlooker, creating an unpleasant view that may be distracting, or generate a negative response to the user.

SUMMARY

In a first embodiment, a device includes an image generation engine to generate multiple light rays forming an image, an eyepiece including a display to project the image to a user for an augmented reality application, the eyepiece comprising a planar waveguide configured to transmit the light rays from the image generation engine, at least one optical element configured to couple the light rays into, and to provide the light rays from, the planar waveguide and through an eyebox limiting a volume that includes a pupil of the user, and an onlooker-functional portion of the eyepiece comprising the at least one optical element, and shaped according to a pre-selected format to make the eyepiece aesthetically appealing to an onlooker when the device is worn by a user.

In a second embodiment, a method of fabricating an eyepiece for an immersive reality device includes forming, on a planar waveguide, an optical pattern configured to transmit light propagating in the planar waveguide through an eyebox delimiting a volume that includes a pupil of a user of the immersive reality device, forming a functional pattern on the eyepiece, the functional pattern shaped according to a pre-selected format that is aesthetically appealing to an onlooker when the immersive reality device is worn by a user, and forming a transition pattern between the optical pattern and the functional pattern.

These and other embodiments will be clear to one of ordinary skill in the art, in light of the following.

BRIEF DESCRIPTION OF THE FIGURES

In the figures, elements having the same or similar reference numeral have the same or similar attributes, unless explicitly stated otherwise.

DETAILED DESCRIPTION

Figure 1:
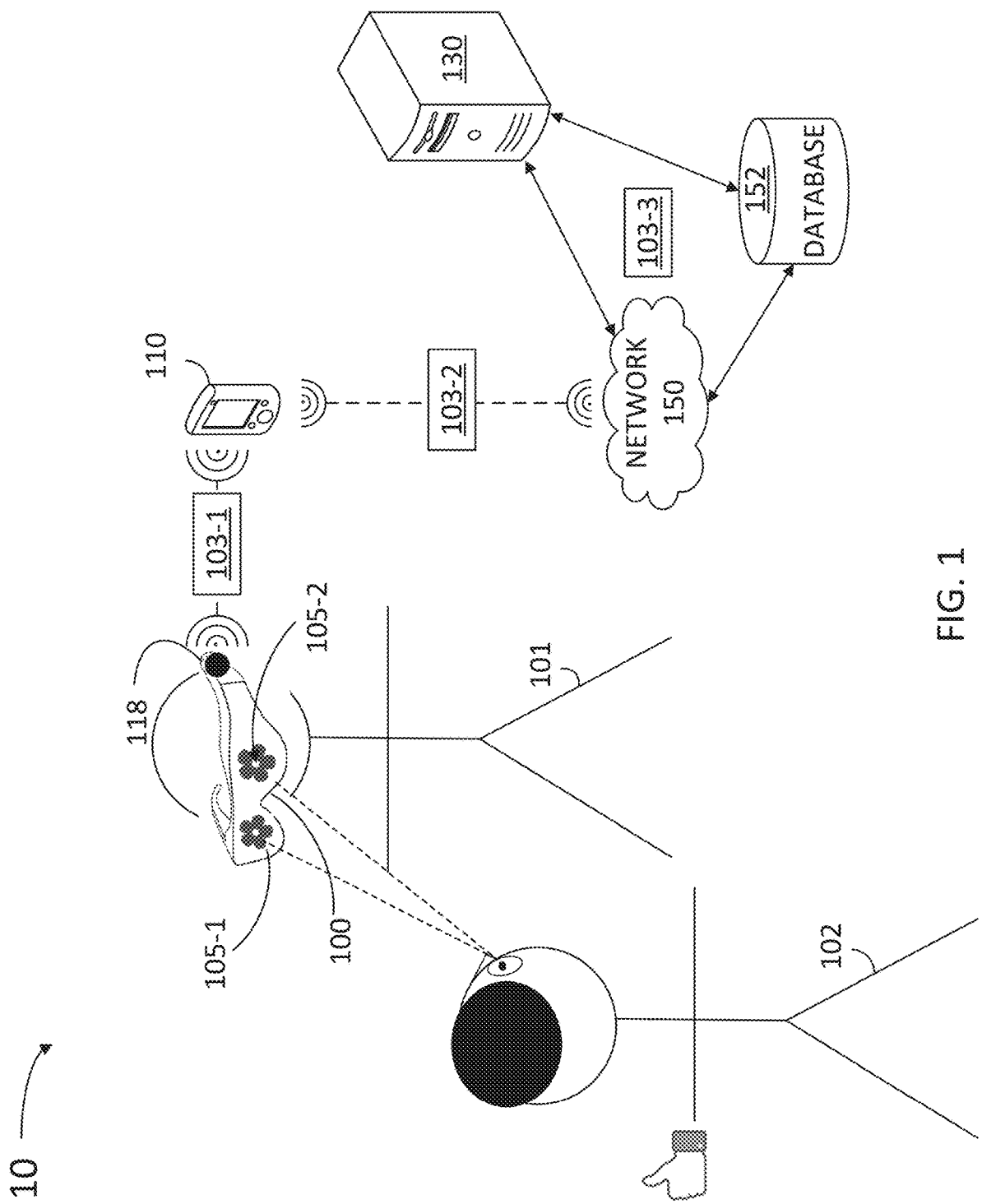
FIG. 1 illustrates an architecture for the use of a smart glass with enhanced structures for augmented reality/virtual reality (AR/VR), according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Smart glasses for use in AR applications typically include optical elements and structures such as gratings, nanostructures, and beam-splitters embedded in the eyepieces. In some cases, these optical elements leak light from the display. For example, the optical structures reflect, refract, or diffract light from external sources. The optical elements are visually pronounced and appear aesthetically unusual and unappealing. Some approaches attempt to make these structures invisible. However, this can be expensive, result in poor optical performance, and complicate the design of the optical structure.

To resolve the above technical problems, some embodiments embrace the optical element to either cover an entire eyepiece surface with it, with both user-functional portions and onlooker-functional portions such that the surface looks uniform or gradient, or otherwise decorative and aesthetically appealing or acceptable for an onlooker. In some embodiments, a user-functional portion is morphed seamlessly into a decorative and aesthetically appealing or acceptable shape or pattern in an onlooker-functional portion of the eyepiece. In general, this means removing or softening any sharp lines of discontinuity and creating smooth function shapes of change. This can reduce the requirements from "perfectly" transparent glasses to an aesthetically pleasing compromise. For example, some embodiments include a gradient sunglass coating from top to bottom. This is considered acceptable and fashionable but is a non-uniform functional area of an overall eyepiece.

A user-functional portion may include a display component that provides the optical operation to deliver the AR optical display light to the eye. In some configurations, the optical operation of the user-functional portion may create an un-desirable optical artifact to an onlooker of the user wearing a smart glass as disclosed herein. In addition, a user-functional portion may include odd, unusual, or unappealing shapes that are distracting and visible to the onlooker. This makes the user look unattractive and cause some discomfort or lack of desire to wear the smart glass. In order to mask these distracting components, embodiments as disclosed herein include onlooker-functional portions that provide a matching "onlooker" appearance to the user-functional portion but is not optically coupled to the functional aspect of the display (e.g., providing a virtual image to the user). In some embodiments, an onlooker-functional portion provides a fully matched surface, or a segment of the lens or eyepiece that is attractively patterned, or a transitionary structure to match to the aesthetic of the smart glass frame. While an onlooker-functional portion is not optically coupled to the frame or display and may not have a functionality from the user perspective, it is optically operational to match an outside perspective of the display component, and therefore is functional (e.g., optically functional) from the onlooker's perspective.

In some embodiments, a user-functional portion in the display or eyepiece of a smart glass may unintentionally release, scatter, or leak light to the onlooker. Accordingly, an onlooker-functional portion can be driven by either lost light from the display or by a separate simple lighting element to match the unintentional leakage from the user-functional portion in the display. In some embodiments, the onlooker-functional portion may provide either full lens matching leakage, or partial lens appealing pattern leakage as seen by the onlooker.

In all cases, it is desired for the user to be unaffected by these additional structures, so design of these structures is optimized for minimal interference with the optical operation of the smart glass (e.g., the display or eyepiece) from the user perspective.

Example System Architecture

FIG. 1 illustrates an architecture 10 for the use of a smart glass 100 with enhanced structures 105-1 and 105-2 (hereinafter, collectively referred to as "enhanced structures 105") for augmented reality/virtual reality (AR/VR), according to some embodiments. Smart glass 100 includes a user-functional portion 105-1 that is formed in an aesthetically pleasing shape for an onlooker 102 (e.g., a flower profile, a Mickey Mouse profile, and the like). User-functional portion 105-1 may include an optically active component 105-2 that directs an AR image to a user 101. The AR image may be a computer-generated image provided in a dataset 103-1 to smart glass 100 by a mobile device 110 or a remote server 130 via wireless communication and a computer network 150 (e.g., dataset 103-2). Remote server 130 may also retrieve or store data (e.g., dataset 103-3) from a database 152 that is communicatively coupled to the computer network. Datasets 103-1, 103-2, and 103-3 will be collectively referred to, hereinafter, as "datasets 103."

Communications module 118 may be configured to interface with network 150 to send and receive information, such as datasets 103, requests, responses, and commands to other devices on network 150. In some embodiments, communications module 118 can include, for example, modems or Ethernet cards. Client devices 110 may in turn be communicatively coupled with a remote server 130 and a database 152, through network 150, and transmit/share information, files, and the like with one another (e.g., dataset 103-2 and dataset 103-3). Datasets 103-1, 103-2, and 103-3 will be collectively referred to, hereinafter, as "datasets 103." Network 150 may include, for example, any one or more of a local area network (LAN), a wide area network (WAN), the Internet, and the like. Further, the network can include, but is not limited to, any one or more of the following network topologies, including a bus network, a star network, a ring network, a mesh network, a star-bus network, tree or hierarchical network, and the like.

The aesthetically pleasing shape of the user-functional portion 105-1 promotes a positive reaction towards user 101 from onlookers 102 and other people in the surroundings of user 101, or at least avoids a negative reaction produced by extraneous optical features reflected off of smart glass 100.

Figure 2:
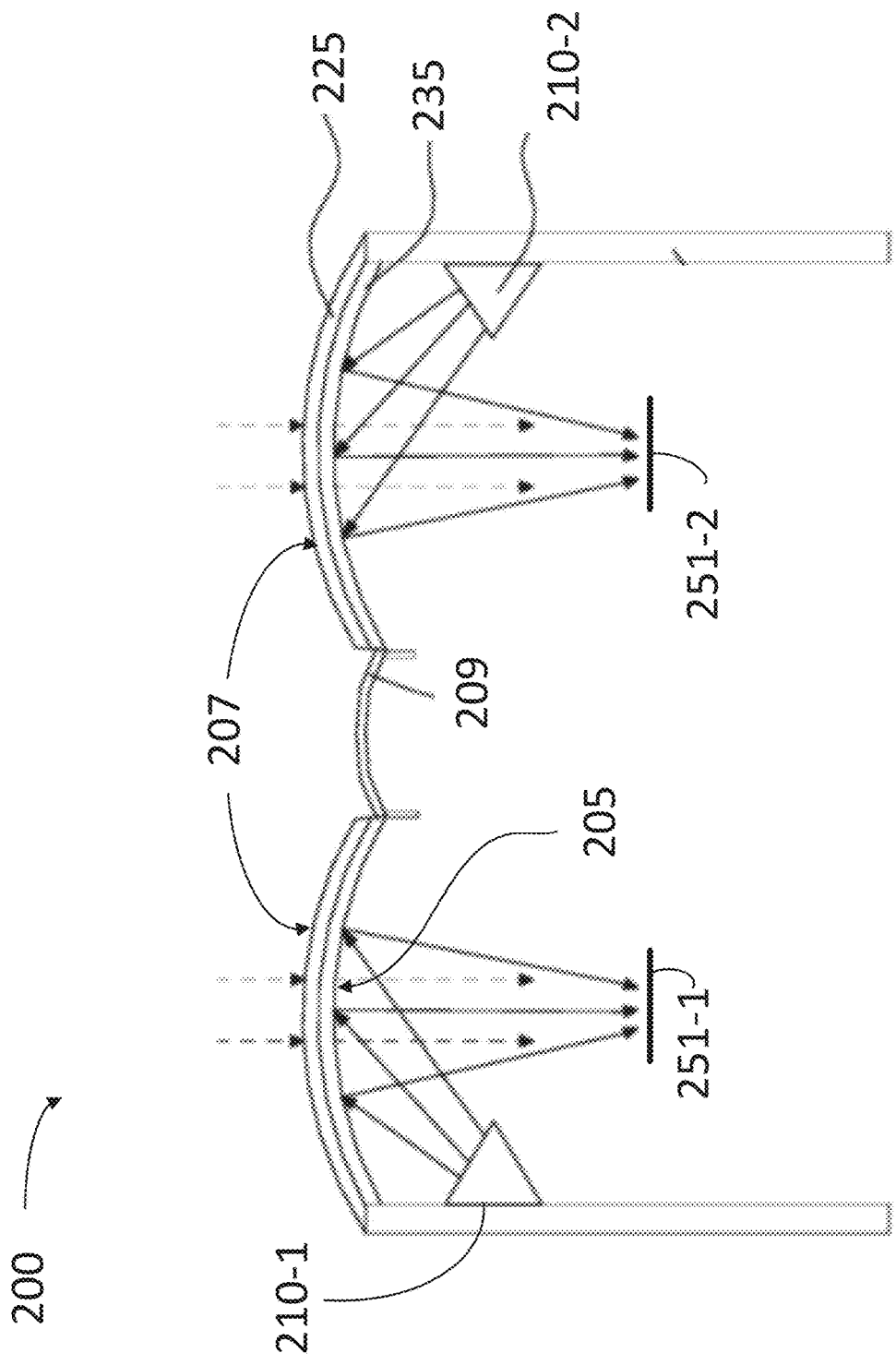
FIG. 2 illustrates a smart glass configured for AR/VR applications, according to some embodiments.

FIG. 2 illustrates a smart glass 200 configured for AR/VR applications, according to some embodiments. In some embodiments, smart glass 200 includes image generation engines 210-1 and 210-2 (hereinafter, collectively referred to as "image generation engines 210") to generate multiple light rays forming an image, and eyepieces 207 having a display 235 to project the image to a user for an augmented reality application, all mounted on a frame 209. In some embodiments, eyepieces 207 include a planar waveguide 225 configured to transmit the image from image generation engines 210 (e.g., including an array source). Eyepieces 207 include at least one optical element in a user-functional portion 205, the optical element configured to couple the light rays into, and to provide the light rays from, planar waveguide 225 and through eyeboxes 251-1 and 251-2 (hereinafter, collectively referred to as "eyeboxes 251"), limiting a volume that includes a pupil of the user. In some embodiments, user-functional portion 205 is shaped according to a pre-selected pattern or format, offering an aesthetically pleasing view to an onlooker.

In some embodiments, the optical element includes a diffractive element built into the lens or eyepiece 207 to direct light to the eye through an output coupler to create eyeboxes 251. Accordingly, the functional diffractive element will have a shape to support this. A transition pattern into an aesthetically pleasing pattern that matches the functional element (e.g., the diffractive element) from an onlooker perspective can be added around user-functional portion 205 to provide a fashionably pleasing shape or uniformize the entire lens. In some embodiments, the functional element may include image optics to couple light from image generation engines 210 into planar waveguide 225. For example, a functional element may include a beamsplitter that reflects or redirects light, rather than waveguides and outcouples. The same treatment as above can be made to make user-functional portion a transition portion around user-functional portion 205.

In some embodiments, eyepieces 207 include a transparent substrate layer that is at least partially transmissive to ambient light. The combination of the ambient light and a computer-generated image provided by image generation engines 210 creates an immersive, augmented reality view for the user.

In some embodiments, image generation engines 210 are external and coupled into planar waveguide 225 via an input coupler like a prism or grating. In some embodiments, image generation engines 210 are structures embedded within the optical element (e.g., a lens). The structure embedded in the optical element may include photonic integrated circuits, and diffractive, refractive, or meta material structures. Accordingly, while there may be no need for an input coupler, some embodiments may still include an output coupler. In some embodiments, image generation engines 210 are either internal or external, but instead of output-coupled, it is diffraction or holographically reflected off a surface in a lens stack forming the optical elements.

Figure 3:
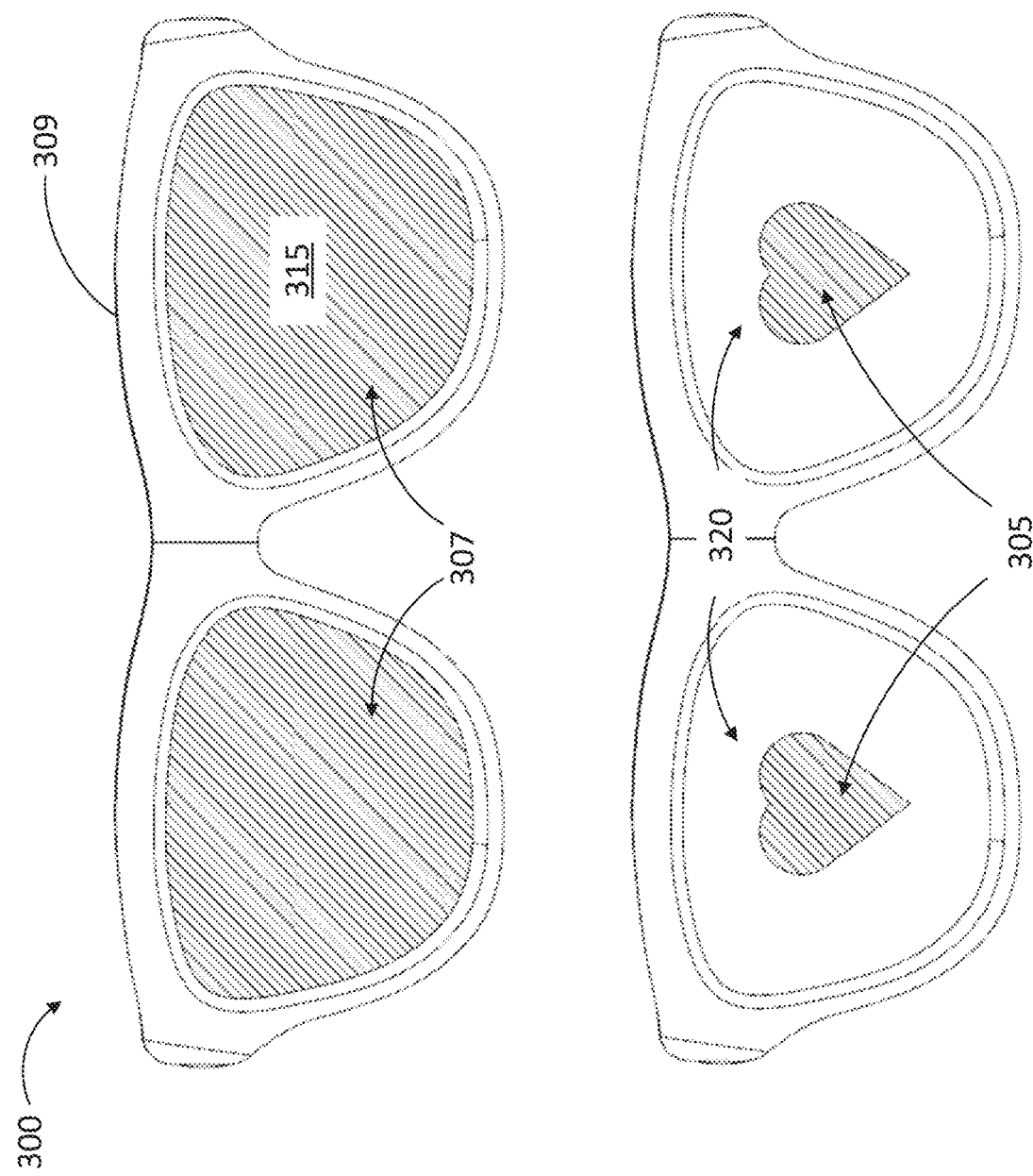
FIG. 3 illustrates a smart glass for AR/VR applications with a selectively diffractive layer that is cut out to form a user-functional portion having an aesthetically pleasing shape for an onlooker, according to some embodiments.

FIG. 3 illustrates a smart glass 300 for AR/VR applications with a selectively diffractive layer 315 that includes a cut out 320 to form a user-functional portion 305 having an aesthetically pleasing shape for an onlooker, according to some embodiments. In some embodiments, selectively diffractive layer 315 includes a surface relief grating, a volume-holographic grating, a polarization grating, and the like, configured to direct the light rays out of a planar waveguide in the eyepieces 307 and into the eyebox of smart glass 300. Eyepieces 307 are mounted on a frame 309.

Figure 4:
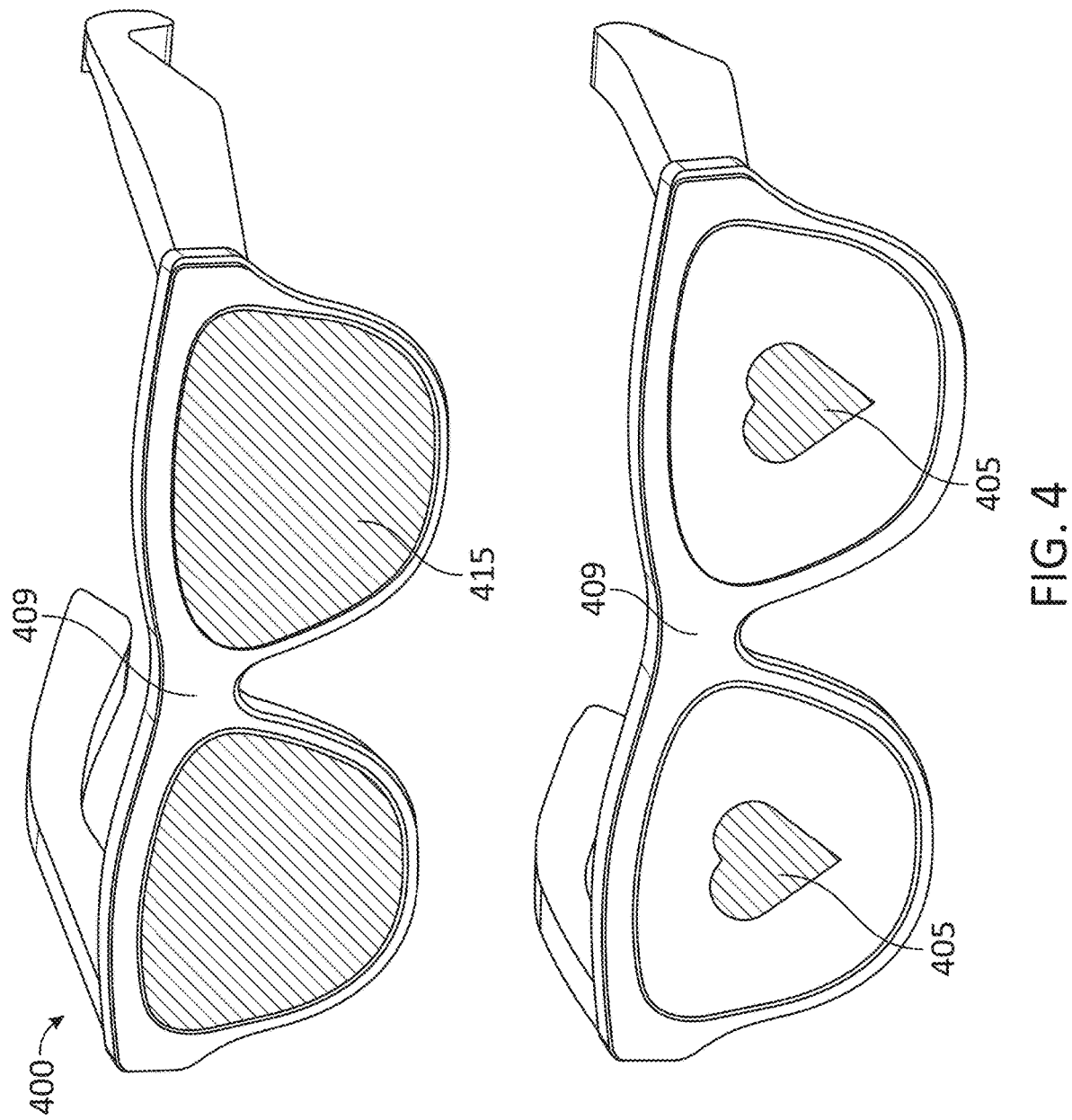
FIG. 4 illustrates a smart glass for AR/VR applications with a selectively reflective layer that is cut out to form a user-functional portion having an aesthetically pleasing shape for an onlooker, according to some embodiments.

FIG. 4 illustrates a smart glass 400 with a frame 409 for AR/VR applications with a selectively reflective layer 415 that is cut out to form a user-functional portion 405 having an aesthetically pleasing shape for an onlooker, according to some embodiments. In some embodiments, selectively reflective layer 415 includes micro- or nano-structured reflection layers configured to reflect image light in a predetermined narrow wavelength band, a particular polarization state, or both, in a direction through an eyebox of smart glass 400 (e.g., eyeboxes 251). In some embodiments, the micro- or nano-structured reflection layer 415 may include a stack of multiple dielectric layers, or a two-dimensional array of plasmonic resonant structures, or a three-dimensional photonic crystal structure, a Bragg reflecting structure, or any combination thereof.

Figure 5:
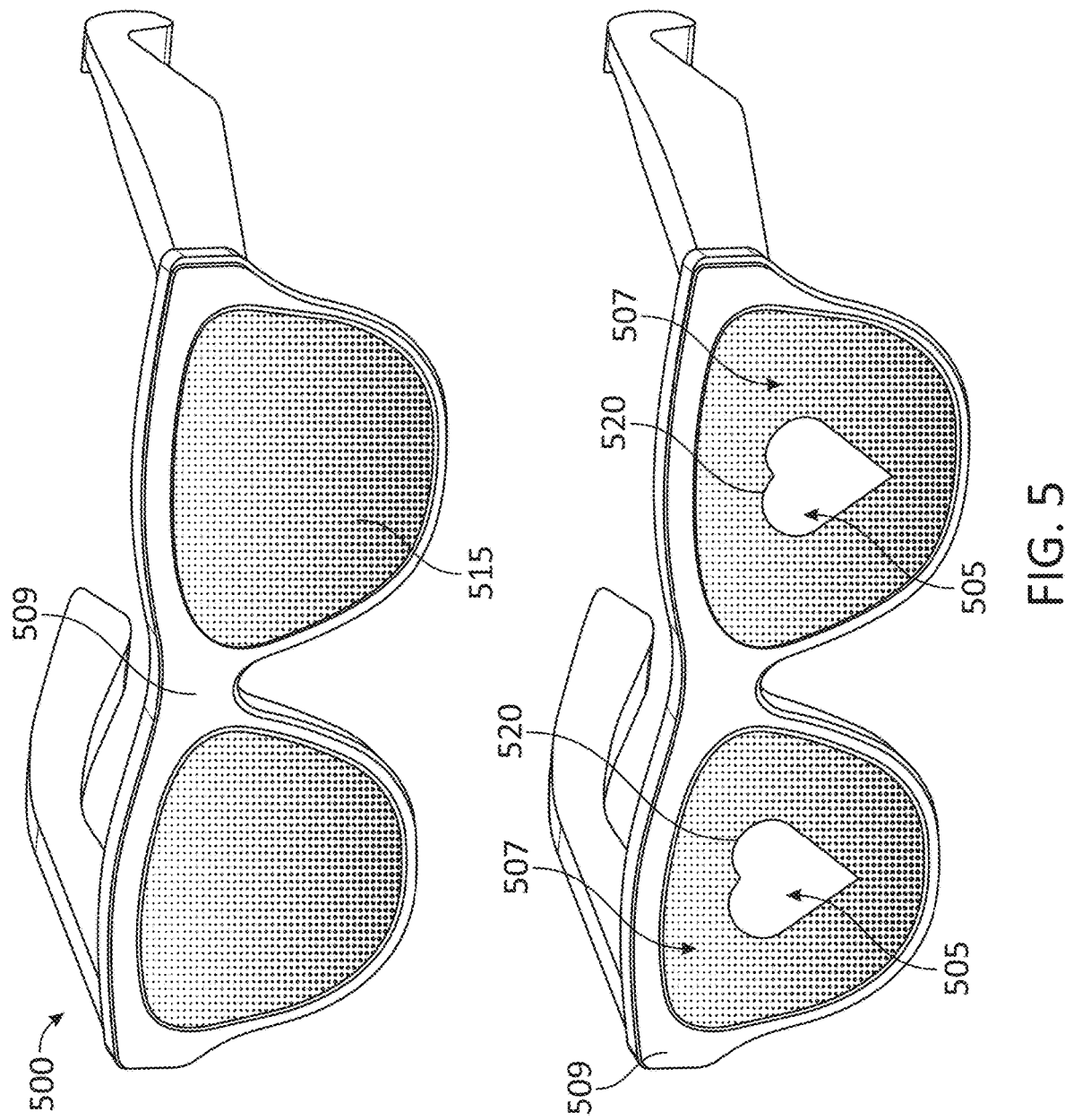
FIG. 5 illustrates a smart glass for AR/VR applications with a coating that is cut out to an aesthetically pleasing shape for an onlooker to clear a user-functional portion, according to some embodiments.

FIG. 5 illustrates a smart glass 500 with a frame 509 for AR/VR applications with a coating 515 that is cut out to an aesthetically pleasing shape 520 for an onlooker to clear a user-functional portion, according to some embodiments. In some embodiments, coating 515 may include a stray light reducing structured substrate to prevent undesirable stray light from passing through an eyebox (e.g., eyeboxes 251). In some embodiments, smart glass 500 may include a functional portion 505. Functional portion 505 may include a uniform or gradient colored surface that is aesthetically pleasing to an onlooker. Accordingly, functional portion 505 may be cut out in an aesthetically pleasing shape or pattern disposed around an optical element in eyepieces 507.

Figure 6:
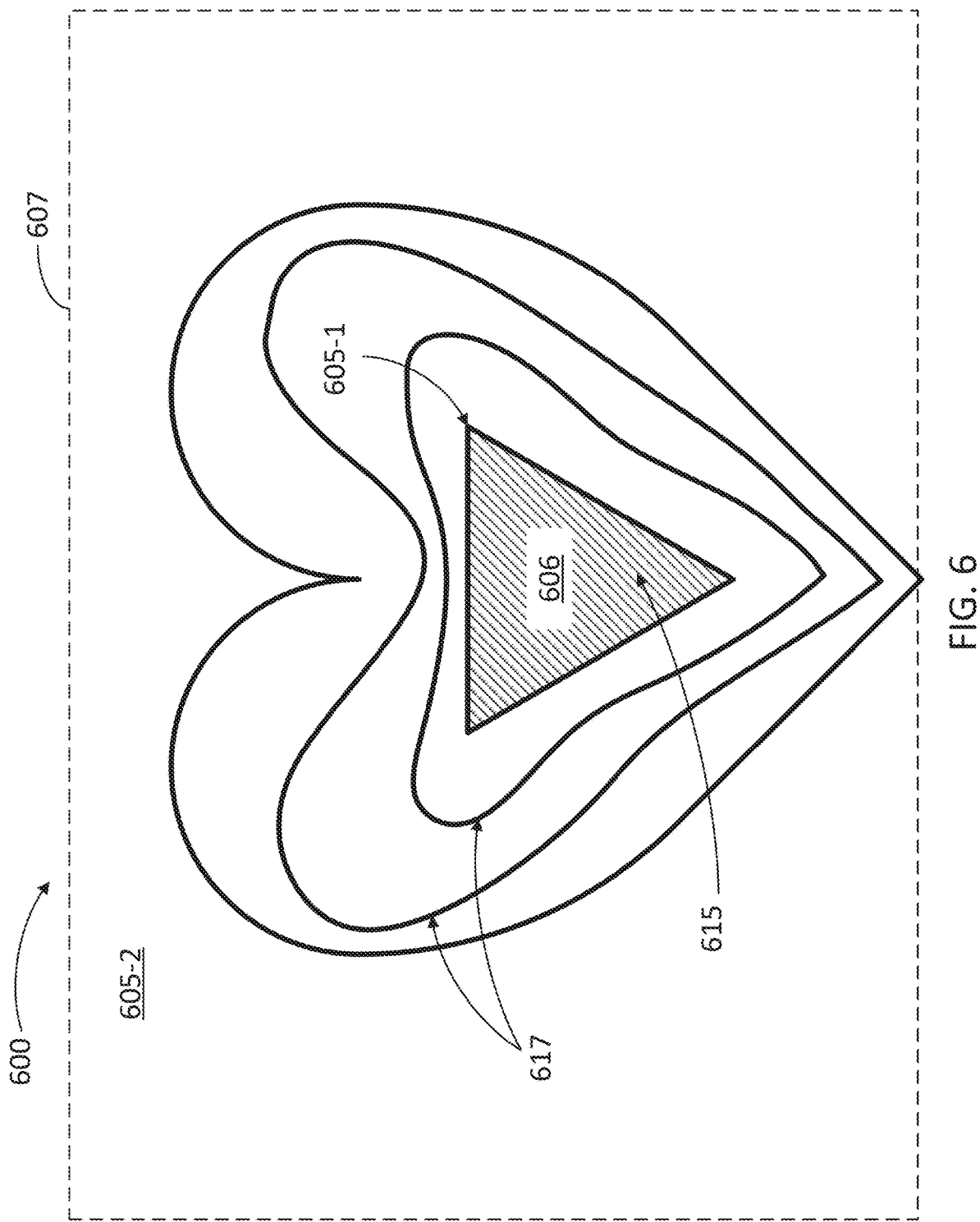
FIG. 6 illustrates a user-functional portion and an onlooker-functional portion in an eyepiece of a smart glass for AR applications, according to some embodiments.

FIG. 6 illustrates a user-functional portion 605-1 and an onlooker-functional portion 605-2 in an eyepiece 607 of a smart glass 600 for AR applications, according to some embodiments. In user-functional portion 605-1, an optical element 606 includes an optical pattern 615 that is continuously deformed from an optically functional shape overlapping user-functional portion 605-1 into an aesthetically pleasing shape overlapping onlooker-functional portion 605-2 via a transition pattern 617. For example, optical pattern 615 may include relief grating grooves, or micro-nano reflectors, and transition pattern 617 may include similar elements but having a reduced refractive power (e.g., shallower grating grooves, lower index contrast, reduced reflectivity, and the like). Sharp ends and curvatures are gradually smoothened in transition pattern 617 to match, in the outer edges, a decorative or aesthetically pleasing shape that has little to no optical functionality but is visible to an onlooker.

Figure 7:
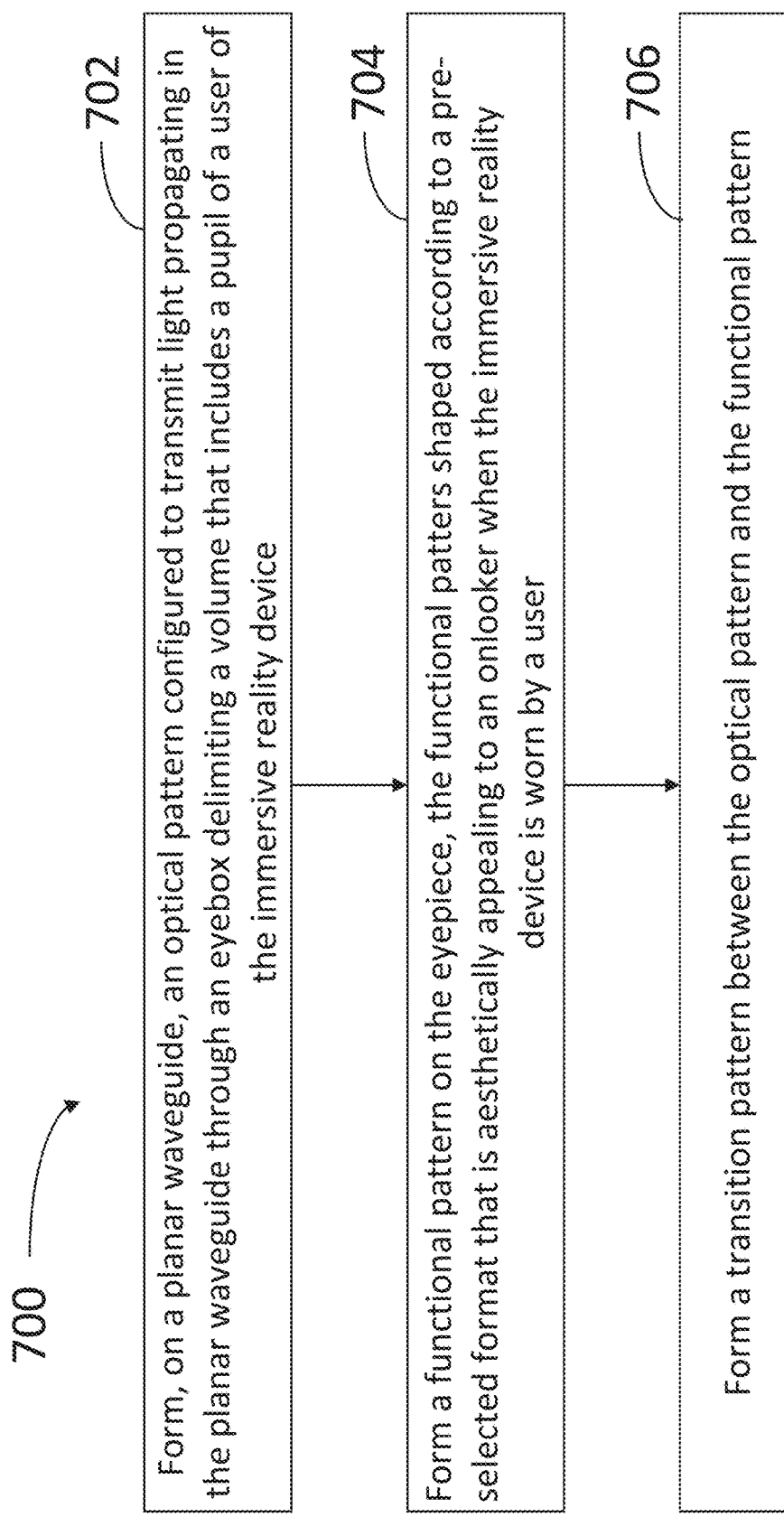
FIG. 7 is a flowchart illustrating steps in a method of fabricating an eyepiece for an immersive reality device, according to some embodiments.

FIG. 7 is a flowchart illustrating steps in a method 700 of fabricating an eyepiece for an immersive reality device, according to some embodiments. Methods consistent with the present disclosure may include one or more steps in method 700 performed in a different order, simultaneously, quasi-simultaneously, or overlapping in time.

Step 702 includes forming, on a planar waveguide, an optical pattern configured to transmit light propagating in the planar waveguide through an eyebox delimiting a volume that includes a pupil of a user of the immersive reality device.

Step 704 includes forming a functional pattern on the eyepiece, the functional pattern shaped according to a pre-selected format that is aesthetically appealing to an onlooker when the immersive reality device is worn by a user. In some embodiments, step 704 includes adding a cutout layer on a surface of the eyepiece configured to face an onlooker. In some embodiments, step 704 includes edging the functional pattern on the planar waveguide around the optical pattern. In some embodiments, step 704 includes forming an aesthetically pleasing feature in the pre-selected format. In some embodiments, step 704 includes forming a feature in the pre-selected format that is transparent to a light configured to propagate through the planar waveguide. In some embodiments, step 704 includes having a feature in the pre-selected format that reflects a light to an onlooker when a user is wearing the immersive reality device.

Step 706 includes forming a transition pattern between the optical pattern and the functional pattern. In some embodiments, step 706 includes forming, in the transition pattern, a feature having a dimension that is larger than a wavelength of light configured to propagate through the planar waveguide. In some embodiments, step 706 includes forming a partially deformed feature from the optical pattern and a partially deformed feature from the pre-selected format. In some embodiments, step 706 includes placing a display on a side of the eyepiece facing the user of the immersive reality device, to project an image to the user of the immersive reality device, for an immersive reality application. In some embodiments, step 706 includes optically coupling a display in the eyepiece with an image generation engine to generate multiple light rays forming an image.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A device, comprising:
   an image generation engine to generate multiple light rays forming an image;
   an eyepiece including a display to project the image to a user for an augmented reality application, the eyepiece comprising a planar waveguide configured to transmit the light rays from the image generation engine;
   at least one optical element configured to couple the light rays into, and to provide the light rays from, the planar waveguide and through an eyebox limiting a volume that includes a pupil of the user; and
   an onlooker-functional portion of the eyepiece surrounding the at least one optical element, and shaped according to a pre-selected format matching an outside perspective of the display to make the eyepiece aesthetically appealing to an onlooker when the device is worn by a user, wherein the onlooker-functional portion is not optically coupled to the display, the eye piece including a transition portion within the onlooker-functional portion and around the optical element, the transition portion shaped to correspond to an outer edge of the pre-selected format.

2. The device of claim 1, wherein the image generation engine comprises anyone of a spatial light modulator, a direct arrayed light source, a light emitting diode array, and a point scanner.

3. The device of claim 1, wherein the image generation engine is external and coupled into the planar waveguide via an input coupler like a prism or grating.

4. The device of claim 1, wherein the image generation engine includes a structure embedded within the optical element.

5. The device of claim 1, wherein the at least one optical element includes a photonic integrated circuit.

6. The device of claim 1, wherein the at least one optical element includes a diffractive, refractive or a meta material structure.

7. The device of claim 1, wherein the image generation engine is either internal or external, and the at least one optical element includes a lens stack having a diffractive or holographic reflecting surface to provide the light rays through the eyebox.

8. The device of claim 1, wherein the at least one optical element includes a diffractive element to couple light into the planar waveguide.

9. The device of claim 1, wherein the at least one optical element includes an at least partially reflective element to couple light into the planar waveguide.

10. The device of claim 1, wherein the at least one optical element includes a diffractive element to couple light out of the planar waveguide and through the eyebox.

11. A method of fabricating an eyepiece for an immersive reality device, comprising:

forming, on a planar waveguide, an optical pattern configured to transmit light propagating in the planar waveguide through an eyebox delimiting a volume that includes a pupil of a user of the immersive reality device;

forming a functional pattern on the eyepiece, the functional pattern shaped according to a pre-selected format matching an outside perspective of the display that is aesthetically appealing to an onlooker when the immersive reality device is worn by a user, wherein the onlooker-functional portion is not optically coupled to the display; and forming a transition pattern between the optical pattern and the functional pattern, the transition pattern shaped to correspond to an outer edge of the pre-selected format.

12. The method of claim 11, wherein forming the functional pattern on the eyepiece comprises adding a cutout layer on a surface of the eyepiece configured to face an onlooker.

13. The method of claim 11, wherein forming the functional pattern on the eyepiece comprises edging the functional pattern on the planar waveguide around the optical pattern.

14. The method of claim 11, wherein forming the functional pattern comprises including an aesthetically pleasing feature in the pre-selected format.

15. The method of claim 11, wherein forming the functional pattern comprises including a feature in the pre-selected format that is transparent to a light configured to propagate through the planar waveguide.

16. The method of claim 11, wherein forming the functional pattern comprises including a feature in the pre-selected format that reflects a light to an onlooker when a user is wearing the immersive reality device.

17. The method of claim 11, wherein forming the transition pattern comprises including, in the transition pattern, a feature having a dimension that is larger than a wavelength of light configured to propagate through the planar waveguide.

18. The method of claim 11, wherein forming the transition pattern comprises including a partially deformed feature from the optical pattern and a partially deformed feature from the pre-selected format.

19. The method of claim 11, further comprising placing a display on a side of the eyepiece facing the user of the immersive reality device, to project an image to the user of the immersive reality device, for an immersive reality application.

20. The method of claim 11, further comprising optically coupling a display in the eyepiece with an image generation engine to generate multiple light rays forming an image.

* * * * *